United States Patent [19]
Phillips

[11] Patent Number: 5,279,390
[45] Date of Patent: Jan. 18, 1994

[54] TREE STAND

[76] Inventor: W. C. Phillips, Rte. 1, Box 91A, Maud, Tex. 75501

[21] Appl. No.: 936,673

[22] Filed: Aug. 28, 1992

[51] Int. Cl.$^5$ .................................. A01M 31/00
[52] U.S. Cl. .................................. 182/187; 182/116
[58] Field of Search ............... 182/187, 116, 188, 100, 182/93, 133, 136; 108/108

[56] References Cited

U.S. PATENT DOCUMENTS

| | | | |
|---|---|---|---|
| 3,282,375 | 11/1966 | Ray | 182/116 X |
| 3,485,320 | 12/1969 | Jones | 182/187 X |
| 4,100,999 | 7/1978 | Conner | 182/187 X |
| 4,257,490 | 3/1981 | Bandy | 182/116 |
| 4,331,216 | 5/1982 | Amacker | 182/136 X |
| 4,552,246 | 11/1985 | Thomas | 182/116 |
| 4,552,247 | 11/1985 | Purdy | 182/187 X |
| 4,742,888 | 5/1988 | Amacker | 182/116 |
| 4,787,476 | 11/1988 | Lee | 182/116 |
| 5,105,908 | 4/1992 | Freund | 182/187 X |

FOREIGN PATENT DOCUMENTS 375022 5/1923 Fed. Rep. of Germany ...... 182/116

OTHER PUBLICATIONS

Dick Davis, "Ambusher deer stand—portable, comfortable," reprinted from article appearing in *Sportsman's Paradise*, Alexandria, La., Oct. 1984, regarding earlier design for a tree stand.
Brochure for "Ambusher Auto-Lock Pole Stand" published by Ambusher, Inc., Texarkana, Tex., regarding earlier design for a tree stand.
Brochure for "Ambusher Auto-Lock Pole Stand" published by W. C. Phillips, Texarkana, Tex., regarding earlier design for a tree stand.
"Operating Instructions" for Ambusher Auto-Lock Pole Stand published in Mar. 1986 regarding earlier design for a tree stand.

*Primary Examiner*—Karen J. Chotkowski
*Attorney, Agent, or Firm*—Crutsinger & Booth

[57] ABSTRACT

The present invention provides an improved tree stand. The tree stand has a frame with a horizontally extending seat platform and at least one leg extending from the frame for partially supporting the platform in an elevated position against a tree, post, or the like. A V-shaped spike bar having a plurality of spikes extends from one side of the platform for engaging the tree. At least one locking arm having at least one spike formed therein is pivotally connected at one end to the side of the platform for engaging the tree. A rope or cable is connected to the other end of the locking arm. A roping dowel extends from the opposite side of the platform. In use, the tree stand is assembled and positioned against a tree, pole, or the like. The rope or cable is whipped to cause the spike on the locking arm to engage the tree and the rope or cable is looped about the roping dowel. The spike on the locking arm and the plurality of spikes on the V-shaped spike bar engage the tree to provide opposed locking forces on the tree. The rope is walked around the tree and securely tied so that the tree stand is ready for use.

6 Claims, 4 Drawing Sheets

TREE STAND

BACKGROUND OF THE INVENTION

This application relates to stands for use in observing and hunting wildlife from an elevated position. More particularly, the stands involved in this application relate to tree stands or stands which are supported in part from or against a tree. More particularly, the present invention relates to a tree stand which can be easily transported, erected and used. The present invention also includes a tree stand with an improved structure for connecting the stand to the tree.

When hunting or observing game it is desirable for various reasons to be in a position elevated above the ground. The elevated position provides a better view of the surroundings and reduces the possibility of detection. In the past, various types of elevated tree stands have been in use. Prior to making the present invention I have made and marketed a single pole tree stand having a pole type ladder-leg to support a horizontal seat or platform against a tree. The platform had spikes on one side thereof and a pair of pivotally mounted spiked locking arms for gripping the sides of the tree. A cinching rope was used to force the locking arms into the sides of the tree and retain the platform in the elevated position.

SUMMARY OF THE INVENTION

My present invention relates to improvements in tree stands of this type. My improved tree stand has a frame with a horizontally extending seat platform and at least one leg extending from the frame for partially supporting the platform in an elevated position against a tree, post, or the like. A V-shaped spike bar extends from one side of the platform for engaging the tree. At least one locking arm is pivotally connected to the side of the platform for engaging the tree. A roping dowel extends from the opposite side of the platform. A fastening means such as a rope, cable or the like extends from the locking arm around the tree to the roping dowel to firmly connect the platform to the tree. In addition, the platform leg is constructed from a rectangular cross section metallic tubing divided into a plurality of longitudinal sections. The sections releasibly engage each other in a pin and socket relationship. In this manner the leg sections can be disassembled and easily transported to a remote site. The plurality of steps are formed on each of the leg sections whereby the leg section can be used as a ladder for reaching the platform. In addition, a leg rest is supported from the platform. Cylindrical sockets are provided on each side of the frame and a gun restblind support is removably connected to the platform through these sockets.

BRIEF DESCRIPTION OF THE DRAWINGS

The advantages and features of the improved stand of the present invention will be more readily appreciated by those of ordinary skill in the art as disclosure thereof is made in the following description by reference to the accompanying drawings in which.

DESCRIPTION OF THE PREFERRED EMBODIMENT

Figure 1:
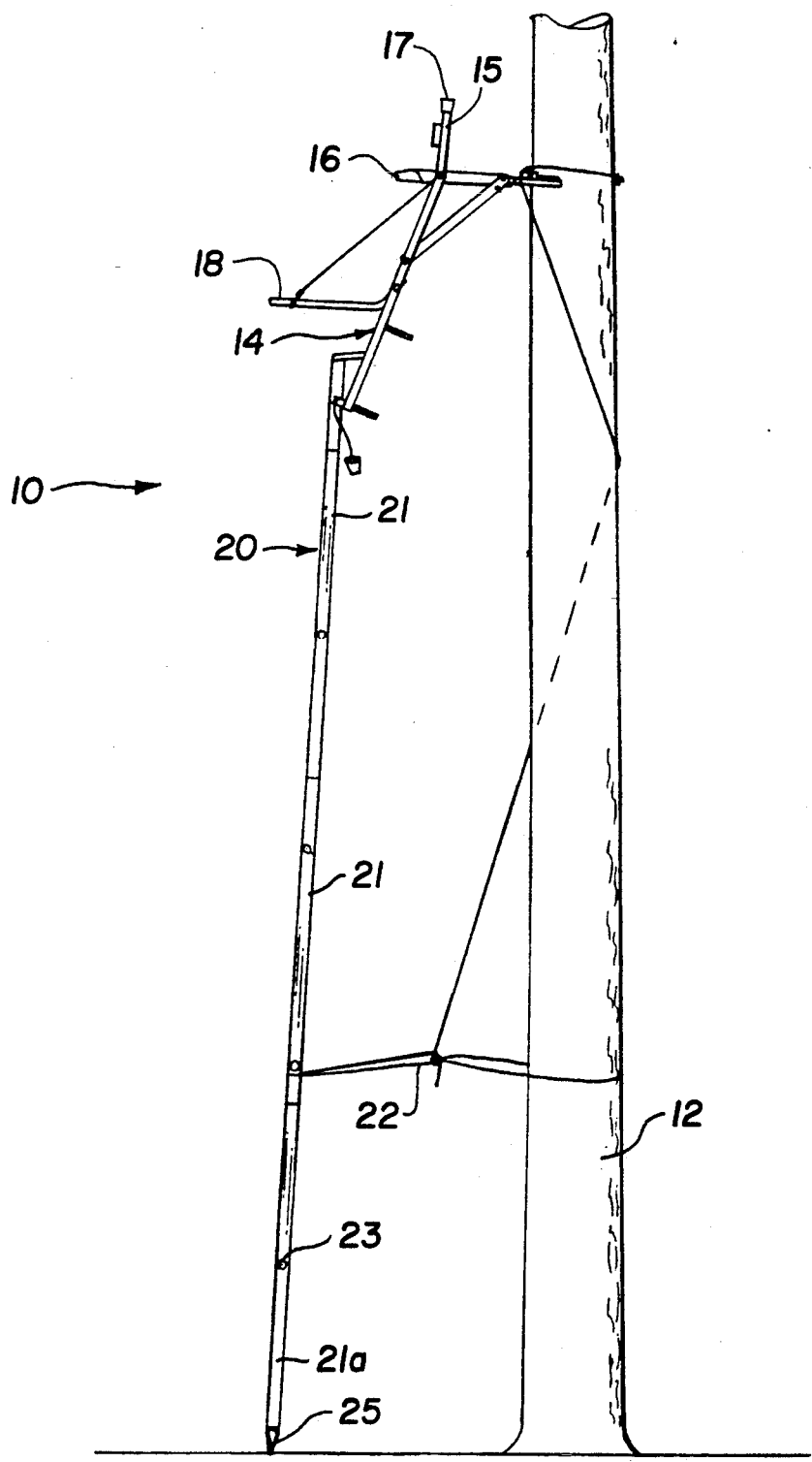
FIG. 1 is a side elevation view showing the improved tree stand assembled and connected to a tree.

Referring now to the drawing wherein like characters designate like or corresponding parts throughout the several views, there is illustrated in FIG. 1 one embodiment of the improved tree stand of the present invention shown assembled and attached to a tree. In FIG. 1 the stand is identified generally by reference numeral 10. In FIG. 1, the stand 10 is shown mounted against the trunk of tree 12. Stand 10 has a frame 14 and a generally horizontally extending seat 16. It is noted that a portion 15 of frame 14 extends above each side of seat 16 as shown. The upper ends of portion 15 act as an arm rest and are covered by a rubber cup 17. Portion 15 forms hand holds to assist in mounting the platform. As will be described, the seat 16 is pivotally connected to frame 14 and will fold into the plane of frame 14 for easy transport.

Footrest 18 is provided and positioned below the seat 16. Footrest 18 extends horizontally from frame 14 in a direction away from the tree 12. The footrest 18 has a non-slip upper surface for safety and like the seat 16, folds into the plane of frame 14 for transport.

Stand 10 has a ladder leg assembly 20. In the present embodiment, leg 20 comprises two upper sections 21 and a lower section 21a.

Figure 4:
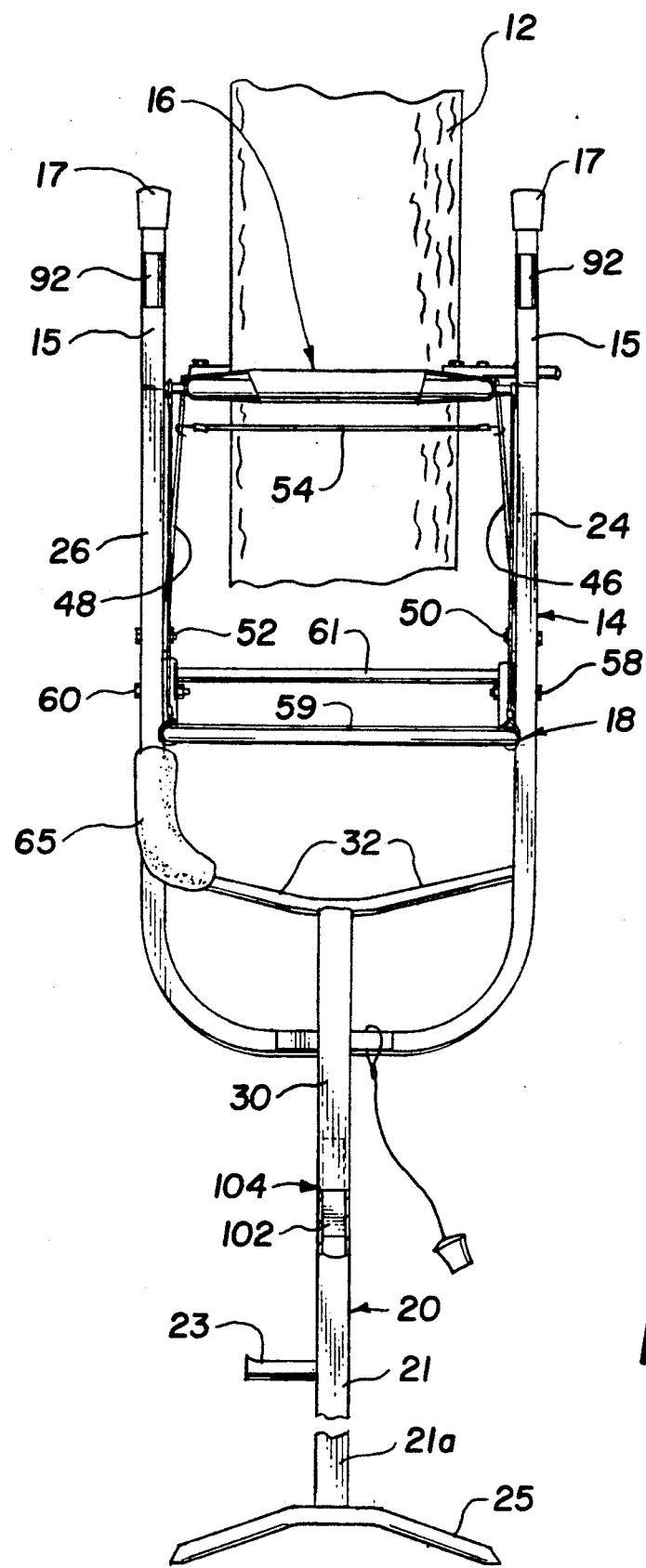
FIG. 4 is an enlarged partial front elevation view of a portion of the tree stand.

As is shown in FIG. 4, the lower leg section 21a is different from the upper two sections 21, in that, it has a stabilizing base 25 welded thereto. As will hereinafter be described in detail, the leg sections 21 and 21a are connected by mating sockets and pins formed at the ends of the leg sections.

As will be described in detail, the leg section 21 and 21a are formed from rectangular cross-section shaped material and have rectangular cross-section pin and socket elements on the ends thereof for assembly into a single leg 20. The ladder leg assembly 20 acts both as a support and a ladder for gaining access to the tree stand 10, as the sections each have a plurality of steps 23 formed thereon.

The tree stand 10 is formed in a plurality of sections which fold up for ease in carrying. In use the stand is transported to the site, assembled and lifted into position with the ladder leg assembly at a slight angle from the tree. As will be described in detail, a fastening means such as a rope 22 is used in conjunction with a "V" locking means (not shown in FIG. 1) to attach the tree stand 10 to the tree 12. The pole 20, which doubles as a ladder, is climbed to gain access to the stand where the user sits on a seat 16, facing away from the tree using the footrest 18 for foot support. In the embodiment shown in FIG. 1, the pole or leg 20 is formed in three sections which allows the tree stand to be installed with the seat 16 at a height of 7 feet, 11 feet or 14 feet. In accordance with my invention, more or less sections could be used. For purposes of understanding the size and perspective of the stand shown in FIG. 1, seat 16 is shown as a padded seat with foam cushioning and a waterproof vinyl covering. The seat itself is 18"×18". It is to be appreciated that the seat could be made of any size to fit the desired application. Preferably, stand 10 is constructed from light weight but strong material such as aluminum alloys used in the aircraft industry.

Figure 2:
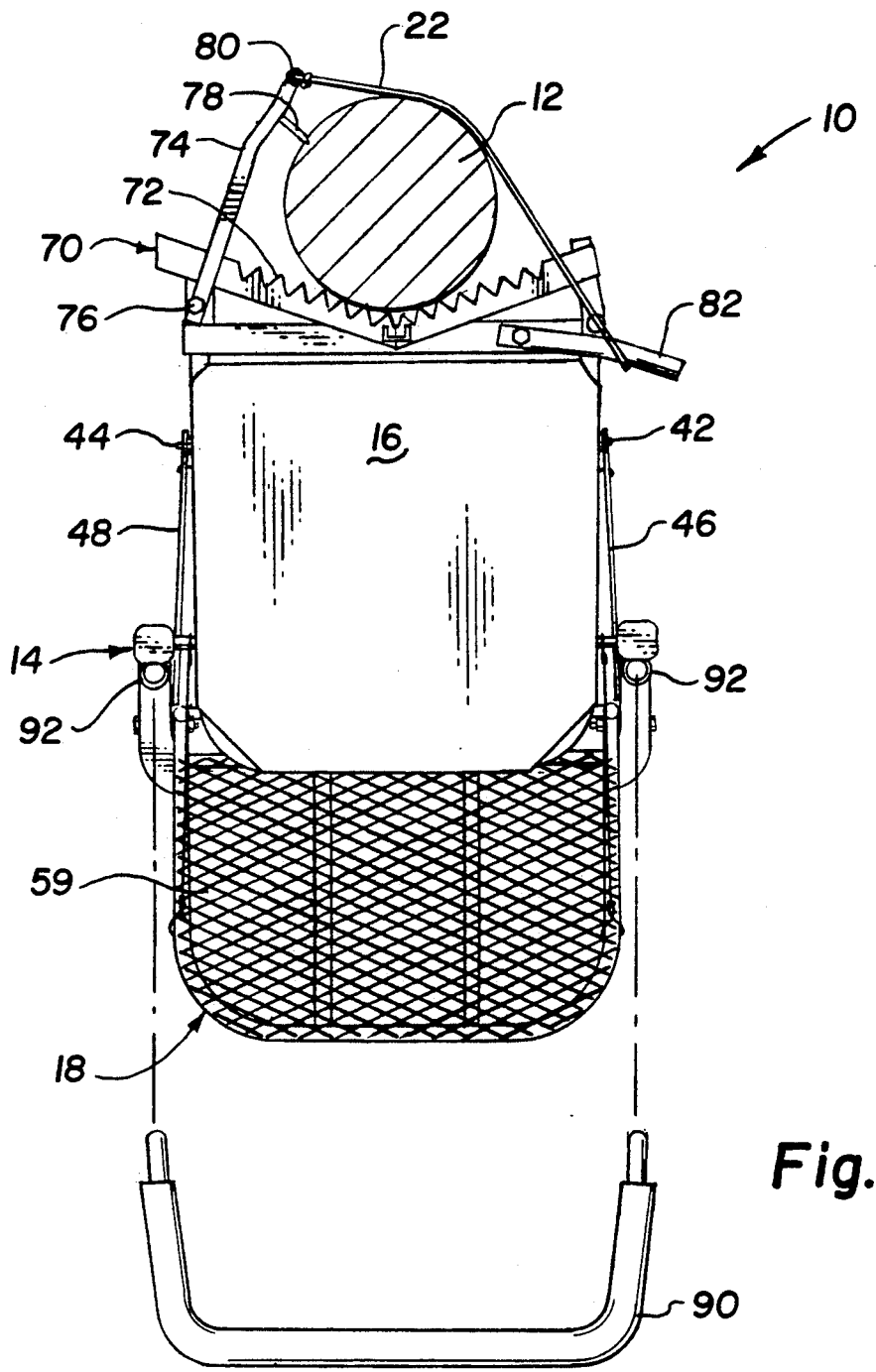
FIG. 2 is a section view taken on line 2—2 of FIG. 1 looking in the direction of the arrows.

By reference to FIGS. 2, 3 and 4 the structural details of the stand 10 of th present invention will be described.

Figure 3:
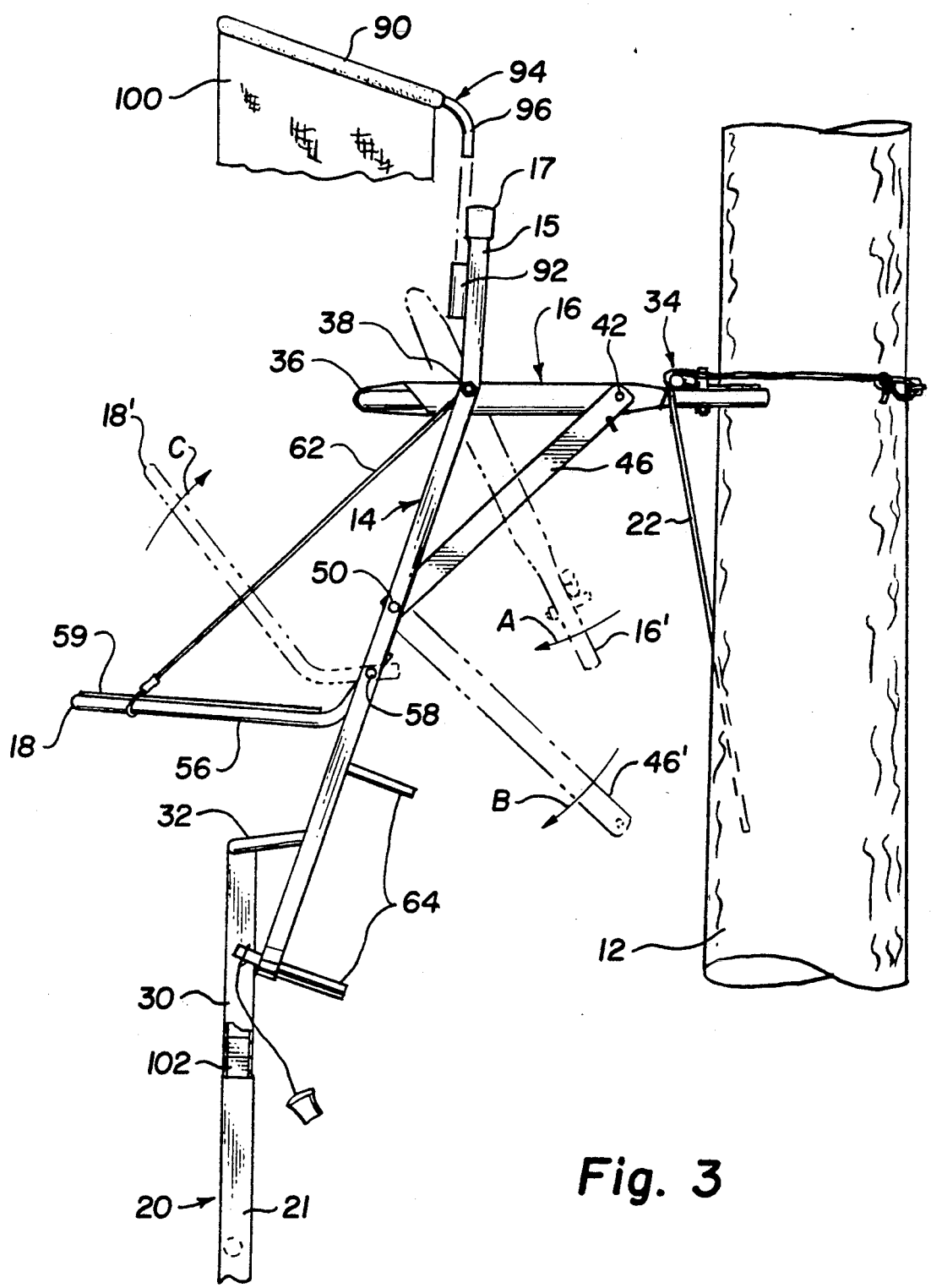
FIG. 3 is an enlarged partial side elevation view of a portion of the tree stand.

As best shown in FIG. 3 and 4, frame 14 consists of a U-shaped portion having upwardly extending legs 24 and 26. The ends of these legs 24 and 26 form portions 15. In the present embodiment of portions 15 have a rubber cup 17 protecting the end thereof. The frame 14 has a downwardly extending portion 30 for removable connection to leg 20. Portion 30 is fixed to the bottom of the U-shaped portion and has a pair of braces 32 in its upwardly extending end. In the preferred embodiment frame 14, portion 30 and braces 32 are welded together to form a rigid structure.

When in use, one end 34 of seat 16 rests against the tree and the other end 36 extends between the legs 24 and 26 of the frame 14. Seat 16 is pivotally connected at 38 to leg 24 and at 40 to leg 26. Pivots 38 and 40 are located in axial alignment along a horizontally extending axis. As is shown in FIG. 3, seat 16 can rotate about pivots 38 and 40 in the direction of arrow "A" to a position completely within the frame 14 for ease in transport. The seat is shown in phantom lines in FIG. 3 in a partially rotated position and is identified by reference numeral 16'. As shown in FIGS. 2 and 3, a pair of pins 42 and 44 extend from opposite sides of the seat 16. A pair of seat braces 46 and 48 are pivotally connected to frame 14 at 50 and 52, respectively. As shown in FIG. 3, this pivotal connection allows the braces 46 and 48 to rotate in the direction of arrow "B." This allows the brace to be rotated within the frame for purposes of transport. In addition, each of the braces 46 and 48 have an aperture therethrough of a size to receive the pins 42 and 44. As best shown in FIG. 4, a resilient means 54 such as a bungi cord is connected between the braces and acts as a lock to resiliently urge the braces 46 and 48 toward each other. In this manner the braces are retained on the pins 42 and 44. The seat is locked in a generally horizontal position when in use. To stow the seat the means 54 is released, the seat braces 46 and 48 are removed from the pins 42 and 44 and the seat and braces are rotated into a position coextensive with the frame 14.

Footrest 18 has a frame 56 pivotally connected at 58 to leg 24 and at 60 to leg 26. Footrest 18 pivots about 58 and 60 in the direction of arrow "C," as shown in FIG. 3. The footrest is shown in phantom lines in FIG. 3 in a partially pivoted position and is identified by reference numeral 18'. In this manner, the footrest can be rotated to a stowed position adjacent to the frame 14. A pair of cables 62 limit downward rotation and provide support for the footrest. The upper surface 59 of the footrest is formed by welding non-slip expanded mesh to the frame 56. A heel rest 61 is welded between the sides of the frame 56 (see FIG. 4). A plurality of short pins 64 extend from the frame 14 as shown in FIG. 3. Pins 64 are useful in connecting the sections of leg 20 to the frame for transport. A pad 65 is formed on frame 14 as shown in FIG. 4 for use in transporting the frame.

According to a particular feature of the present invention stand 10 utilizes a V-lock system for attachment to a tree. This V-lock system extends from the frame of the seat 16 at end 34. As can be seen in FIG. 2, the seat frame has extending portions 66 and 68 which support a V-shaped tree receiving member 70. Member 70 forms a V-shaped opening whose internal angle is between 90 and 180 degrees and is preferably approximately 130 degrees for engaging the side of the tree. A plurality of spikes or teeth 72 are formed along the length of the member 70. Teeth 72 assist in preventing torque or rotation about the tree. A locking bar 74 is pivotally connected at 76 to the frame of the seat 16. The outer end of the bar 74 has at least one spike 78 thereon. An eyelet 80 is formed on the end of the bar for receiving a rope, cable or the like. A roping dowel 82 extends from the frame of the seat on the side opposite the pivot 76. A fastening means such as rope 22 has one end connected to the eyelet 80. When in use the rope passes around the back of the tree and over roping dowel 82 as shown in FIG. 1 to force the pivotally mounted, spiked locking bar 74 into the side of the tree to connect the platform 16 to the tree as shown. The teeth 72 on V-shaped member 70 and the spike 78 of locking bar 74 when engaged by the rope provide opposed locking forces on the tree.

In FIG. 3 a combined gun rest-blind, which is generally referred to by the numeral 90, is shown separated from the frame 14. Frame 14 has a pair of tubular sockets 92 welded to the portions 15. Sockets 92 are used for removably attaching the gun rest 90 to the frame. The gun rest 90 consists of a tubular frame 94 bent into a generally U-shaped configuration. The frame 94 has a pair of downwardly extending ends 96 which form pins that slip into the interior of the sockets 92 for releasibly attaching the blind to the frame. Optionally, the frame 96 can have foam padding around the frame 94 and a camouflage skirt or blind material 100 hanging in a downward direction as shown in FIG. 2 camouflaging a portion of the tree stand 10 from view.

In FIG. 4 a typical pin and socket connection utilized to connect the leg sections 21 together and to connect the leg sections 21 with portion 30 is shown. This leg section has a pin end 102. The pin end 102 has an exterior shape which is rectangular and fits in and closely approximates the interior of the next adjacent section. Interior 104 of the adjacent sections 21 and portion 30 form a socket into which the pin 102 releasibly fits to connect the ladder sections together.

To set up the stand 10 lower the foot rest 18 so the seat 16 will clear, then raise the seat 16 to correct height. Hook the seat position braces 46 and 48 on the pins 42 and 44. Use the elastic lock 54 to hold the braces on the pins. Next connect the ladder sections 21 and 21a and the stand is ready to set up.

"Walk" the stand 10 up and lean the stand 10 against the tree at a slight angle as shown in FIG. 1. Press the base 25 firmly into the ground. Use the rope 22 to whip the spike 78 into the tree and loop the rope over the roping dowel 82 as shown in FIG. 2. Pull the rope tight and walk around tree reversing the direction of pull— then pull tight and force spike into tree.

While holding the rope tight, walk around the pole section and position the the rope about shoulder height. Now make one or two revolutions around the tree before binding the rope to the pole section (See FIG. 1).

Bind the criss-crossing ropes together as shown to create sufficient pressure on the pole to hold the locking system securely. Make sure rope is tied securely under pressure, but excessive pressure is not necessary.

The foregoing description relates to only one embodiment of the present invention. It should be understood that the present invention contemplates that numerous alteration and changes can be made to the form of the invention without departing from the scope of the following claims.

I claim:

1. A hunting stand for attachment to a tree, post, or the like to support a hunter in an elevated position, the stand having a horizontally extending seat platform and at least one leg extending from the platform for partially supporting the platform in an elevated position against a tree, post or the like, the improvement which comprises:

- a V-shaped spike bar connected to one end of said platform, said V-shaped spike bar having a plurality of teeth for connecting said platform to the tree, post or the like;
- at least one locking arm, said locking arm having at least one spike thereon, one end of said locking arm pivotally coupled to one side of said platform for pivoting said locking arm into releasable engagement with the tree, post, or the like;
- a roping dowel mounted on said platform on the side opposite said one side; and
- a fastening means connected to said locking arm such that when said fastening means is drawn over said roping dowel, said locking arm is pulled toward said roping dowel into engagement with the tree, post, or the like and said spike on said locking arm is opposed to at least one of said teeth on said V-shaped spike bar to provide opposed locking forces on the tree, post, or the like.

2. The hunting stand of claim 1 wherein said fastening means comprises a flexible element such as a rope or cable.

3. The hunting stand of claim 1 additionally comprising a pair of vertically extending sockets mounted on either side of the other end of said platform and a gun rest removably supported from said sockets.

4. The hunting stand of claim 1 wherein in at least one leg formed from tubing with a rectangular cross-section.

5. The hunting stand of claim 4 wherein said at least one leg is formed in longitudinal sections which are releasibly connected together by pin and socket couplings at their ends.

6. The hunting stand of claim 5 wherein said rectangular cross-section tubular member has a plurality of steps extending from either side thereof and a foot formed on the lowermost section.

* * * * *

UNITED STATES PATENT AND TRADEMARK OFFICE
CERTIFICATE OF CORRECTION

PATENT NO. : 5,279,390
DATED : JANUARY 18, 1994
INVENTOR(S) : W.C. PHILLIPS

It is certified that error appears in the above-indentified patent and that said Letters Patent is hereby corrected as shown below:

Column 2, line 68, "th" should be -- the --; and

Column 4, line 52, please delete the second "the".

Signed and Sealed this

Twenty-fourth Day of May, 1994

Attest:

BRUCE LEHMAN

*Attesting Officer*   *Commissioner of Patents and Trademarks*